Mar. 20, 1923. 1,448,904
F. N. SPRAGUE
SPRING SUPPORTING SHOCK ABSORBING SHACKLE FOR AUTOMOTIVE VEHICLES
Filed Feb. 9, 1922
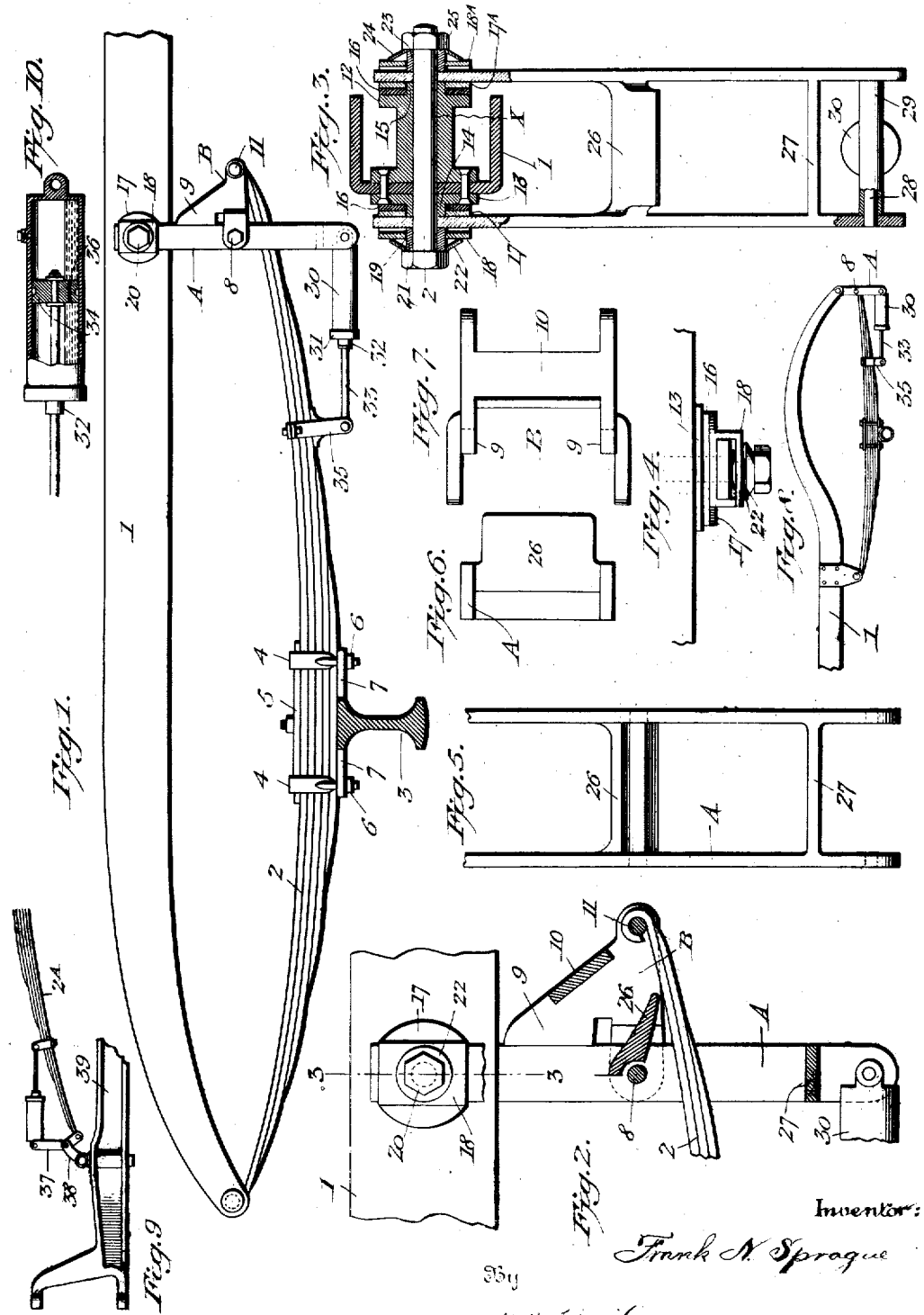
Inventor:
Frank N. Sprague
By
H. S. Bailey,
Attorney Patented Mar. 20, 1923.

1,448,904

UNITED STATES PATENT OFFICE.

FRANK N. SPRAGUE, OF HOLYOKE, COLORADO.

SPRING-SUPPORTING SHOCK-ABSORBING SHACKLE FOR AUTOMOTIVE VEHICLES.

Application filed February 9, 1922. Serial No. 535,326.

*To all whom it may concern:*

Be it known that I, FRANK N. SPRAGUE, a citizen of the United States of America, residing at Holyoke, county of Phillips, and State of Colorado, have invented a new and useful Spring-Supporting Shock-Absorbing Shackle for Automotive Vehicles, of which the following is a specification.

My invention relates to spring supporting, shock absorbing shackles for automotive vehicles, and is designed as an improvement over an invention embodied in a patent which was issued to me on July 11, 1916, No. 1,190,966.

The object of the present invention is to provide a shackle for securing one end of a spring to the side bar of a vehicle, and which is constructed to permit the full resiliency of the spring under average road and load conditions, but which eliminates a portion of the length of the spring when the same is under more than average compression, whereby the resiliency of the spring is diminished, means being provided for making gradual the transition from the maximum resiliency of the spring to its maximum stiffness, thereby preventing sudden jolts or shocks to the vehicle. Further, to provide a shackle of this character which is adapted not only to gradually reduce the resiliency of the spring under sudden and excessive compression and rebound, but which is also adapted to eliminate the teetering or swinging action of the car body, which is common with the use of shackles of the usual construction.

These objects are accomplished by the character of shackle illustrated in the accompanying drawings, in which:

Figure 1 is a side view of a portion of the side bar of an automobile, showing one of the side springs secured thereto at its front end in the usual manner, the rear end being connected to the bar by the improved shackle, auxiliary shock absorbing means being shown in connection with said shackle.

Fig. 2 is an enlarged sectional view showing a fragment of the side bar and the improved shackle and parts connected therewith, including a portion of the spring, one end of which is supported by said shackle.

Fig. 3 is a sectional view on the line 3—3 of Figure 2, the lower end portion of the shackle being partly in section, and the spring-end-supporting member being omitted.

Fig. 4 is a plan view showing a portion of the side bar and one member of the shackle and parts connected therewith.

Fig. 5 is an elevation of a portion of the shackle viewed from the opposite direction to that shown in Figure 3, parts carried by the shackle being omitted.

Fig. 6 is a top view of the shackle.

Fig. 7 is a top view of the spring-end supporting member of the shackle.

Fig. 8 is a side view of the rear end portion of the side bar showing the end of the spring connected directly to the shackle, the pivoted spring-end supporting member being omitted.

Fig. 9 is a fragmental front view showing the adaptation of the absorber to the front spring of a vehicle. And Fig. 10 is a sectional view of the auxiliary oil and air cushioning cylinder used in connection with the improved shackle.

Referring to the accompanying drawings, the numeral 1 indicates the side bar of an automobile frame, to the forward end of which is secured in the usual manner, one end of an ordinary semi-elliptic spring 2, the opposite end of which is connected to the side bar by the improved shackle, in a manner to be presently described. The spring is connected to the forward axle 3 by U-clips 4 which bear upon the stepped ends of a plate 5, which rests upon the top leaf of the spring, the threaded ends of the clips being secured by nuts 6 to horizontal plates 7, which form an integral part of the axle.

The improved shackle comprises a main yoke-shaped hanger A, the upper ends of which are connected to the side bar in a manner to be presently described; and a spring-end supporting member B, which is mounted on a bolt 8 which passes through the hanger about midway of its length. The member B comprises parallel side members which for a portion of their length are the same distance apart as the side bars of the hanger, but their inner ends are spread, as shown, to lie against the outside faces of the sides of the hanger, and these ends have holes for the reception of the bolt 8, by which a hinge connection is formed between the hanger and the member B. The sides of the member B have upwardly extending abutment lugs 9, which normally bear against the adjacent edges of the sides of the hanger, and the sides of the member B are connected by an integral web 10. A bolt 11 passes through the outer ends of the member B and this bolt supports the rear end of the upper leaf of the spring 2, the said spring end being rolled to form an eye through which the bolt passes in the usual manner.

The parts thus far described are embodied in my patent above referred to, and a brief description of the action of the shackle thus far described is deemed necessary in order to a clear understanding of the cooperation between the same and the auxiliary cushioning means set forth in the present application, and which will be hereinafter fully set forth.

Under average conditions, either when the vehicle is at rest or when the springs are not subjected to violent compression, the lugs 9 of the spring end supporting member B engage the adjacent edges of the sides of the hanger, even when the hanger is swung slightly to one side by the straightening out of the spring under average compression. But when the spring is compressed to an extent that causes it to bear forcibly against the bolt 8, the full resiliency of the spring is checked, as that part of the spring beyond the bolt 8 is eliminated as a cushioning factor, and the spring pressure is exerted between the bolt 8 and the bolt at the forward end of the spring, and the member B swings slightly on its pivot bolt 8, so that the abutment lugs 9 are out of engagement with the sides of the hanger. The lifting power of the spring on the beginning of the rebound is thus exerted against the bolt 8, but as the spring assumes its normal curve, the member B is swung up by the contraction in the length of the spring until the lugs 9 again engage the hanger, and the lifting power is instantly transferred from the bolt 9 to the bolt 11. The above means of absorbing the shock has been found in actual practice to be both practical and effective, but the auxiliary cushioning means set forth in the present application not only renders the cushioning action gradual under all conditions, but the transition from the maximum resiliency of the spring, to its maximum stiffness, under sudden and violent shocks, is also gradual, by reason of the improved construction of the hanger in connection with auxiliary cushioning means, all of which will now be particularly described.

To the inner face of the vertical wall of the side bar, which is of channel form in cross section, as shown by Figure 3, is riveted a hub 12, the length of which corresponds to the depth of the said bar. A circular plate 13 is also secured upon the outer face of the side bar by the same rivets which secure the hub 12 to the side bar, and the plate 13 and also the outer end of the hub 12 are formed with short, circular projections or bosses 14 and 15 respectively, which surround a bolt hole X which is formed through the plate 13, the wall of the side bar and the hub. Suitable non-metallic washers 16 are placed upon the bosses 14 and 15, the thickness of said washers equalling half the length of the bosses, and upon the portions of the bosses which project beyond the washers 16 are placed friction disks 17 and 17$^A$, upon the outer faces of which are formed open ended, vertical socket members 18 and 18$^A$, the front walls of which are formed with holes 19 of the same diameter as those in the disk portions 17 and 17$^A$, which fit upon the bosses 14 and 15. The upper end portions of the hanger A are provided with bolt holes, and these end portions are inserted in the lower ends of the socket members 18 and 18$^A$, and moved up until the holes in the said end portions register with the bolt hole X, extending through the plate 13, the side bar and the hub 12, and a bolt 20 is then passed through the hole X. But upon the bolt is first placed a short sleeve 21, which is adapted to rest against the head of the bolt, and around the sleeve 21 is placed a resilient cupped washer 22, and when the bolt 20 is passed through the hole X, the rim of the cupped washer engages the outer face of the socket member 18, and the sleeve 21 passes through the hole 19 in the outer face of the said member. A short sleeve 23 is then placed upon the outer end of the bolt, and inserted in a corresponding hole in the adjoining wall of the socket member 18$^A$, a cupped washer 24 is placed around the sleeve and a nut 25 is then screwed upon the bolt and against the washer 24. As the nut is tightened, the head of the bolt clamps the sleeve 21 against the adjoining leg of the hanger, while the nut 25 clamps the sleeve 23 against the other leg of the hanger, thus clamping the legs of the hanger into frictional engagement with the ends of the bosses 14 and 15, respectively. At the same time the cupped washers 22 and 24 are compressed against the socket members 18 and 18$^A$ by the bolt head and the nut respectively, thus clamping the friction disks 17 and 17$^A$ into frictional engagement with the washers 16, and as the openings in the socket members 18 and 18$^A$ are of greater depth than the thickness of the hanger arms, the cupped washers, which are under continuous pressure, act to hold the disks 17 and 17$^A$ in continuous frictional engagement with the washers 16, whereby free swinging movement of the hangers is prevented, and the teetering or swinging motion of the vehicle body is greatly diminished, particularly on smooth roads, and when the vehicle is going at a slow rate of speed.

At an intermediate point in the length of the hanger, is formed an abutment 26, which bridges the space between the side members of the hanger, and is integrally connected to them. This abutment extends out rearwardly between the side members of the spring support B, and terminates about midway between the bolts 8 and 11. This abutment is slightly curved on its under side, and inclines downwardly from the level of the bolt 8, to a point slightly above the spring when the same is at rest. By reference to Figure 2 it will be seen that as the spring is depressed by the drop of the vehicle, the end of the abutment 26 is caused to engage the spring, and if the shock is heavy, the under side of the abutment will come into contact with the spring and ride thereon, until the spring engages the bolt 8, when the spring will be under its maximum stiffness, as the portion of the spring from the bolt 8 to the bolt 11 is eliminated. Thus, the abutment 26, by engaging the spring between the bolts 8 and 11, makes gradual the transition from the maximum resiliency of the spring to its maximum stiffness, even under violent shocks, the action being the same under excessive rebound of the vehicle body.

Cooperating with the shackle, I also employ a combined oil and air cushioning cylinder for neutralizing even the slightest shocks to which the spring may be subjected, and this cylinder is arranged and constructed as follows:

The side members of the hanger are connected near their lower ends by a cross bar 27, the side members being extended a short distance below the said bar.

A pin 28 is supported in these extended portions, and a hub 29, formed on the rear end of a cylinder 30, is pivotally mounted on the said pin. The cylinder 30 has a removable cap 31 on its opposite end, provided with a suitable packing box 32, and through this packing box extends a piston rod 33, the inner end of which carries a piston 34. The opposite end of the rod is pivotally connected to a bracket 35, which is rigidly connected to the spring, the cylinder being horizontally disposed. The cylinder is partially filled with oil, and one or more ports or holes 36 are formed through the piston, below the oil level.

As the hanger A is swung by the compression and rebound of the spring, the piston is reciprocated in the cylinder, but its movement is retarded by the resistance offered by the oil, a portion of which is forced rearward through the holes 36 as the piston advances. The oil in advance of the piston, however, reduces the air space in advance of the piston, and simultaneously acts in conjunction with the piston to compress the air in said space, and thus by means of the gradually compressed air ahead of the cylinder in conjunction with the resistance offered by the oil through which the piston passes, the shock transmitted from the spring to the cylinder is gradually cushioned and absorbed, the various shock resisting features of the shackle all cooperating to produce the desired result.

In Figure 8 is shown a modification in which the spring supporting member B is omitted and the end of the spring is supported upon the bolt 8. The cylinder 30 is connected to the lower end of the hanger, the same as in Figure 1, and the piston rod is also connected to the spring, the same as in Figure 1. In this arrangement the cylinder 30 alone is relied upon as the shock absorbing means.

In Figure 9 is shown the adaptation of the cylinder to the front spring 2$^A$ of a vehicle, and in this arrangement a shackle 37 is employed which is pivotally mounted midway of its length in a bracket 38, which is supported on the front axle 39.

As the shackle rocks under the compression and rebound of the spring 2$^A$, the piston in the cylinder acts to cushion the shock in the manner described in connection with Figure 1.

Having described my invention, what I claim as new and desire to secure by Letters Patent, is:

1. The combination with the axle and side bar of a vehicle, and a leaf spring secured to said axle and at one end to said side bar, of a hanger pivotally attached to the side bar adjacent the opposite end of the spring, a member hinged to said hanger and extending at right angles thereto, the free end of which supports the adjacent end of said spring, abutments on the hinged member which normally engage the hanger, and means for gradually retarding the swinging action of the hanger under the compression and rebound of the spring.

2. The combination with the axle and side bar of a vehicle, and a leaf spring secured to said axle and at one end to said side bar, of a hanger having a pivoted but frictional attachment with said side bar, a member hinged to said hanger and extending at right angles thereto, to which the opposite end of said spring is attached, abutments on the hinged member which normally engage the hanger, and cushioning means connecting the spring and the lower end of the hanger for gradually retarding the swinging action of the hanger under the compression and rebound of the spring.

3. The combination with the axle and side bar of a vehicle, and a leaf spring secured to said axle and at one end to said side bar; of a U-shaped hanger pivotally but frictionally attached to said side bar, a bolt extending through said hanger, a member pivotally mounted on the bolt and extending at right angles to the hanger and having abutments for normally engaging the hanger, the other end of said spring extending through said hanger below said bolt and being attached to the extended portion of the pivoted member, a cushioning cylinder attached to the lower end of said hanger having a piston therein, and a rod connecting said piston and said spring.

4. The combination with the axle and side bar of a vehicle, a spring secured to said axle and at one end to said side bar and a bolt extending through the side bar; of a U-shaped hanger pivotally mounted on said bolt, friction elements mounted on said bolt between the side bar and the ends of the hanger and means for pressing said hanger ends in forcible engagement with said friction means, a bolt extending through the hanger below the side bar, a member pivotally mounted on the bolt and extending at right angles to the hanger and having abutments for normally engaging the hanger, a bolt in the outer end of said member, the other end of the spring being passed through the hanger below the first mentioned bolt, and secured to the latter bolt, and cushioning means connecting the lower end of the hanger and the spring.

5. The combination with the axle and side bar of a vehicle; of a spring secured to said axle and at one end to said side bar, and a bolt extending through said bar having a nut thereon; of a U-shaped hanger mounted on said bolt, friction disks on said bolt between the sides of the hanger and the bar, plates having socket members which are loosely mounted on the hanger arms, said plates bearing against the friction disks, resilient elements interposed between the bolt head and adjacent socket member, and between the nut and the adjacent socket member, whereby when the nut is tightened the said plates are forced into frictional engagement with the friction disks, a bolt extending through the hanger, a support pivoted to said bolt and extending beyond the hanger, and having abutments which normally engage the hanger, the adjacent end of said spring being extended through the hanger below the said bolt and connected to the extended portion of the support, and a cushioning medium connecting the lower end of said hanger and said spring.

6. The combination with the axle and side bar of a vehicle, and a spring secured to said axle and at one end to said side bar; of a U-shaped hanger in pivotal but frictional engagement with said side bar, a bolt extending through said hanger intermediate of its length, an abutment foot connecting the sides of said hanger at the level of said bolt and extending out beyond the hanger, a support comprising connected members which are pivotally mounted on said bolt and extend out at right angles to said hanger and having uprights in normal engagement with the hanger, said abutment foot lying between said connected members, the other end of said spring extending through said hanger and beneath said bolt and said abutment foot and being connected to said pivoted support, and cushioning means connecting the lower end of said hanger and said spring.

7. The combination with the axle and side bar of a vehicle and a spring secured to said axle and at one end to said side bar; of a U-shaped hanger in pivotal but frictional engagement with said side bar, a bolt extending through the hanger intermediate of its length, a support comprising connected members which are pivotally mounted on said bolt and extend rearward at right angles to the hanger, said support having upright portions in normal engagement with said hanger; a bolt in the extended ends of said support, the other end of said spring extending through said hanger below and adjacent the bolt therein, and being connected to the bolt in said support; an abutment foot integrally connected to said hanger at the level of the bolt therein and extending out between the members of said support and terminating midway between the hanger and the adjacent end of the spring and slightly above the spring; a combined air and liquid cylinder secured to the lower end of said hanger and having a piston therein, and a rod connecting said piston and said spring.

8. The combination with the axle and side bar of a vehicle and a spring secured to said axle and connected at one end to said side bar, of a hanger pivotally connected to said side bar, a bolt extending through said hanger intermediate of its length, a support comprising connected side members which are pivotally mounted on said bolt and are extended rearward beyond said hanger, having upright portions in normal engagement with said hanger, the other end of the spring extending through said hanger, below the bolt therein and being secured to the end of said support, whereby, under average conditions the maximum resiliency of the spring is employed, said bolt engaging said spring under heavy compression of the same, thereby eliminating the portion of the spring end beyond the bolt and giving to the spring its maximum stiffness, and means for making gradual the transition from the maximum resiliency of the spring to its maximum stiffness, comprising a foot integrally connected to said hanger at the level of the bolt therein and adapted to engage the spring midway between the hanger and the end of the spring as the spring is compressed.

9. The combination with the axle and side bar of a vehicle and a spring secured to said axle and attached at one end to said side bar; of a hanger pivotally attached to said side bar, means connected to said hanger for supporting the other end of the spring and for eliminating a portion of the length of the spring under heavy compression of the same. thereby giving to the spring its maximum stiffness. and means connected with the hanger for making gradual the transition from the maximum resiliency of the spring to its maximum stiffness.

10. The combination with the axle and side bar of a vehicle. a spring secured to said axle and at one end to said side bar. a plate on the side bar having a circular boss. a hub on the side bar having a circular boss. a bolt extending through said plate. side bar and hub. and a nut on said bolt: of a U-shaped hanger mounted on said bolt. friction disks mounted on said bosses. plates mounted on said bosses in engagement with the friction disks and having socket members through which the hanger arms pass. sleeves interposed between the bolt head and adjacent hanger arm and between the nut and adjacent hanger arm and passing through the socket members. resilient cupped washers interposed between the bolt head and the adjacent socket member and between the nut and the adjacent socket member. whereby. when the nut is tightened. the plates are forced into frictional engagement with the friction disks and the sleeves are forced into engagement with the hanger arms. pivoted means on the hanger for supporting the opposite end of the spring. and cushioning means connecting the spring and the lower end of the hanger.

11. The combination with the axle and side bar of a vehicle. a spring secured to said axle and connected at one end to said side bar: of a U-shaped hanger pivotally connected to said side bar and in frictional engagement therewith and adapted to support the other end of the spring. a cylinder pivotally attached to the lower end of the hanger and adapted to be partially filled with oil. a piston in said cylinder having an opening therein below the oil level. a piston rod secured at one end to said piston. and a bracket on said spring to which the opposite end of said piston rod is secured.

In testimony whereof I affix my signature in presence of two witnesses.

FRANK N. SPRAGUE.

Witnesses:
G. SARGENT ELLIOTT,
ELIZABETH SMITH.